July 5, 1932. R. S. SANFORD 1,865,591
RETARDING MECHANISM
Original Filed April 6, 1928  2 Sheets-Sheet 1
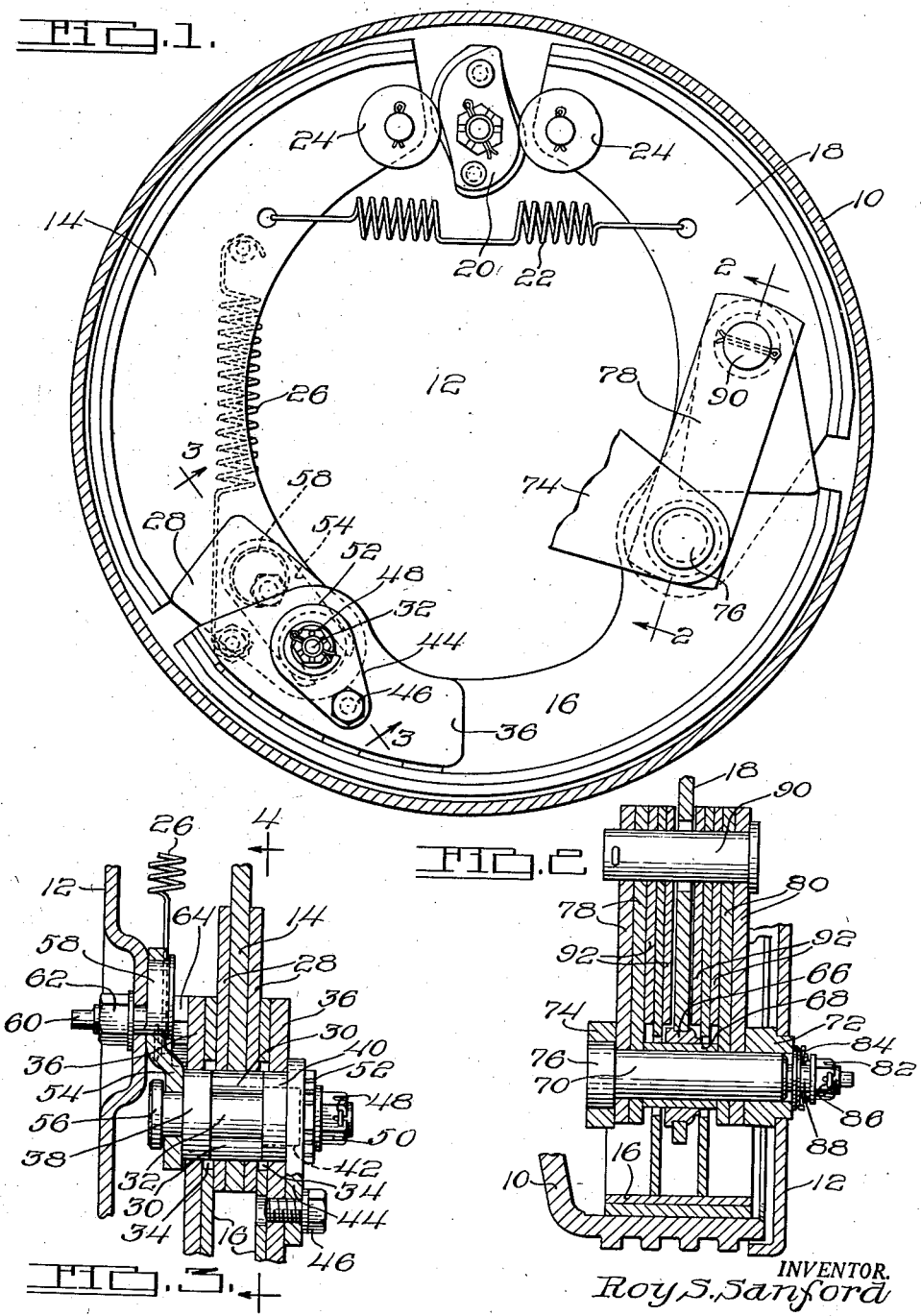
INVENTOR.
Roy S. Sanford
BY M. W. McConkey
ATTORNEYS.

July 5, 1932.                R. S. SANFORD                1,865,591
                         RETARDING MECHANISM
             Original Filed April 6, 1928    2 Sheets-Sheet 2
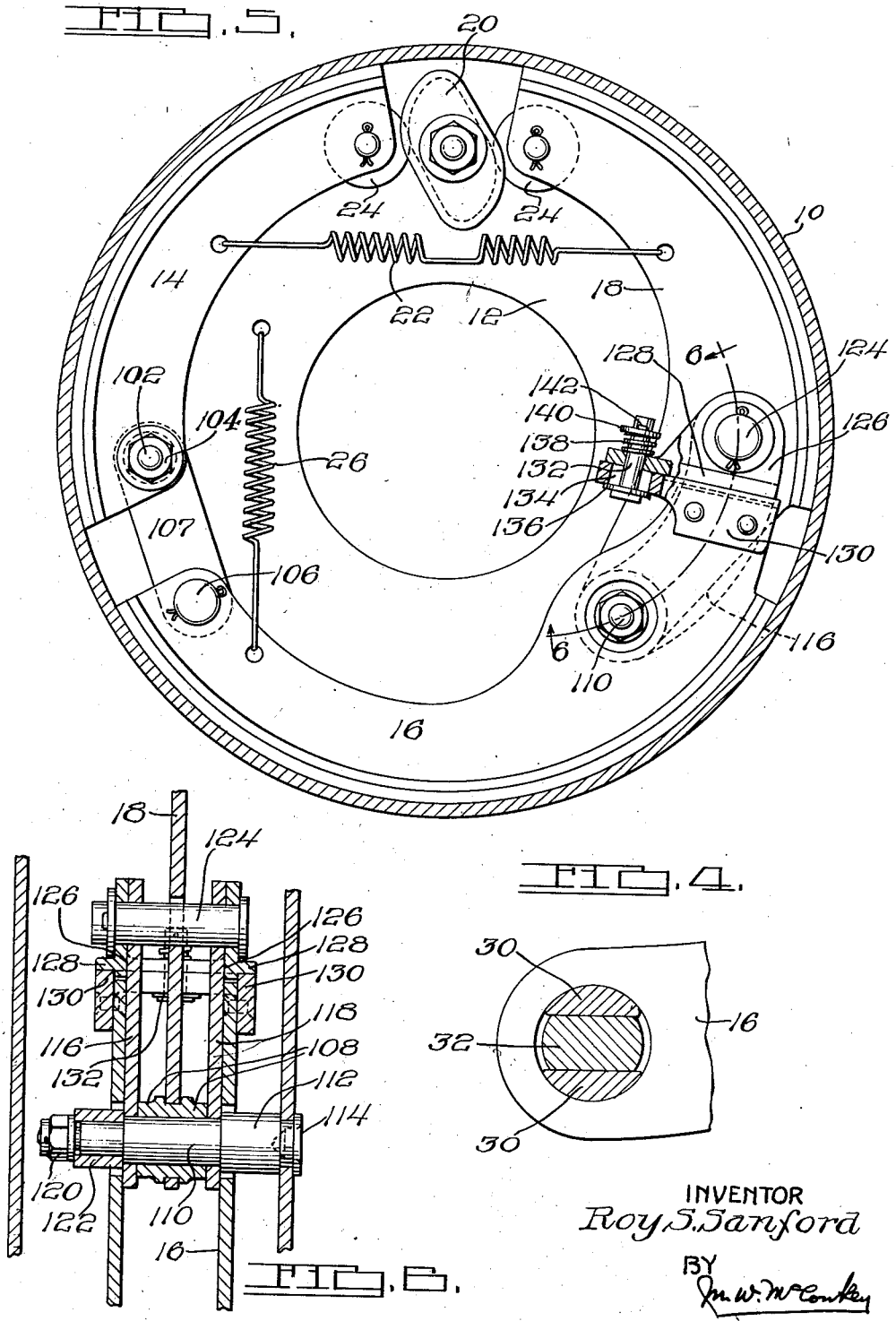
INVENTOR
Roy S. Sanford
BY
M. W. McConkey
ATTORNEY Patented July 5, 1932

1,865,591

UNITED STATES PATENT OFFICE

ROY S. SANFORD, OF SOUTH BEND, INDIANA, ASSIGNOR TO BENDIX BRAKE COMPANY, OF SOUTH BEND, INDIANA, A CORPORATION OF ILLINOIS

RETARDING MECHANISM

Application filed April 6, 1928, Serial No. 267,860. Renewed March 23, 1931.

This invention relates to retarding mechanism such as a brake, and is illustrated as embodied in an internal expanding brake for an automobile wheel. An object of the invention is to arrange the shoes, or equivalent friction devices, so that their ends can shift slightly radially of the drum to permit the shoes to adjust their positions automatically for full and effective engagement with the drum.

In the preferred form of brake, where there is a floating primary or "servo" shoe acting to apply an anchored secondary shoe, the floating joint between the shoes or their equivalents is shown arranged to permit relative radial movement of the adjacent ends of the shoes. While many of the advantages of the invention are attainable by using a simple linkage connecting the shoes, I consider it best to connect them by arranging the one shoe end to have a radial sliding movement as well as a pivotal movement on a pivot carried by the other shoe end. For example, the first shoe end may have one or a pair of plano-convex members with their plane surfaces slidably engaging a flattened portion of the pivot carried by the other shoe end.

Whether or not the above-described type of brake is adopted, I prefer to arrange the brake anchorage to allow the desired self-adjusting movement of the friction means, it being especially desirable that there be fully effective engagement of the shoes or their equivalents adjacent the anchorage. In the illustrated type of brake, in which the secondary and auxiliary shoes overlap at their anchored ends, one of them (illustrated as the secondary shoe) has means such as a tension link which takes its braking torque, and which is preferably mounted on a fixed pivot on which the auxiliary shoe is directly pivoted. The linkage on which the secondary shoe is anchored is, in one embodiment, provided with an additional sliding friction joint. In another embodiment the linkage is frictionally mounted at one end so that normally there is no independent loose pivoting of the linkage, this independent movement only taking place when necessary to compensate for wear.

The above and other objects and features of the invention, including various novel and desirable details of construction, will be apparent from the following description of the illustrative embodiments shown in the accompanying drawings, in which:

Figure 1 is a vertical section through a brake embodying one form of the invention, just inside the head of the brake drum, and showing the brake shoes in side elevation;

Figure 2 is a partial section, on the line 2—2 of Figure 1, through the brake anchorage;

Figure 3 is a partial section, on the line 3—3 of Figure 1, through the novel floating joint;

Figure 4 is a section through the floating joint, on the line 4—4 of Figure 3, showing the plano-convex sliding members;

Figure 5 is a section corresponding to Figure 1, but showing a brake embodying a different form of the invention; and Figure 6 is a partial section, on the line 6—6 of Figure 5, through the anchorage of the brake of Figure 5.

The brakes illustrated include generally a rotatable drum 10, at the open side of which is a support such as a backing plate 12, and within which are the primary, secondary, and auxiliary shoes 14, 16, and 18 forming the friction means of the brake. The brake is applied by means such as a double cam 20, acting against the resistance of a return spring 22 on rollers 24. The secondary shoe 16 is applied by the primary shoe 14 against the resistance of a secondary return spring 26.

In the arrangement of Figures 1–4, shoes 14 and 18 are T-shaped in cross section, being formed with central stiffening webs which are straddled by opposite ends of a pair of spaced parallel stiffening webs forming part of shoe 16. The lower end of the web of shoe 14 is extended to form a pivot arm, which may be reinforced by separately-formed plates or stampings 28 projection-welded to its opposite sides, and which is formed at its end with a circular opening to be mounted on a novel pivot.

This pivot, in the form shown, includes a pair of plano-convex members 30 fitting the opening in the pivot arm, and slidably embracing opposite parallel plane surfaces on a flattened pivot 32 which is somewhat smaller in its width than the diameter of the opening in the pivot arm. Thus the shoe 14 and the members 30 can slide radially on the pivot 32.

In order to facilitate manufacture, the two webs of shoe 16 are shown with relatively large openings 34 for the pivot, separately-formed plates or heavy stampings 36 projection-welded to opposite sides of the webs being formed with bearing openings sleeved on a cylindrical collar 38 of pivot 32, and on a wide bearing washer 40 sleeved on a smaller-diameter wider collar 42. A plate 44 keyed on collar 42 and secured to one of the plates 36, by means such as a screw 46, holds pivot 32 against turning in shoe 16, and is clamped against the ends of members 30 by a castelated nut 48 acting on a solid washer 50 and a lock washer 52, thus frictionally gripping members 30 in any radial position to which they are shifted by the braking pressures.

At its other end, pivot 32 has a small-diameter portion freely embraced by the forked lower end of a stop 54, and terminates in a flange 56 which co-operates with collar 38 to form a groove which receives stop 54 and holds pivot 32 against endwise movement. The upper end of stop 54 has an opening mounted on an eccentric 58 having a flange holding the stop or plate 54 frictionally gripped against the backing plate. Eccentric 58 has a threaded stem 60 passing through the backing plate to receive a clamp nut 62. The eccentric 58 is turned to adjust the stop or plate 54 so that the pivot 32 engages the bottom of the fork when shoe 16 is in the desired released position. Shoe 16 may have a washer 64 projection-welded to the side of one of its webs and slidably engaging the eccentric 58, to position the shoe laterally.

Shoe 18 has its stiffening web extended as an anchor arm provided with a bushing 66 sleeved on a spacer bushing 68 mounted on a fixed anchor pivot 70 mounted in a bracket 72 secured to the backing plate, or formed as an integral extension of the front wheel knuckle or rear axle housing if preferred, and also if desired in another extension 74 at the opposite end of the pivot.

Pivot 70 is shown formed with a head 76 engaging the side of one of two double-thickness links 78 and 80, between which the spacer bushing 68 is arranged, and which acts through the links and the spacer bushing to co-operate with a nut 82 to draw the two links toward bracket 72 to clamp them frictionally in place. Nut 82 acts through solid washers 84 and 86, between which is a spring washer 88. Normally this construction prevents angular movement of links 78 and 80, although they can shift when necessary to permit the shoe 16 to take up a new position.

At their upper ends, the links 78 and 80 are pivoted on a cylindrical pivot 90 passing through a relatively large clearance opening in the web of shoe 18, and pivoted to two spaced anchor arms formed as extensions of the webs of shoe 16, preferably reinforced by separately-formed stampings 92 projection-welded to their sides. The webs of shoe 16 have relatively large clearance openings for the anchor pivot 70.

It will be seen that links 78 and 80 form tension elements transmitting the braking torque of shoe 16 from the end overlapped by shoe 18 to the pivot 70 on which shoe 18 is directly anchored.

In the arrangement of Figures 5 and 6, shoe 14 has a compression link 107 frictionally gripped to its lower end by a pivot bolt 102, with its nut 104, and this link is connected to shoe 16' by a pivot 106.

Shoe 18 is here shown pivoted on a spacer bushing 108 mounted on a fixed pivot 110 having at its end a collar 112 with a projection riveted over at 114 to mount the pivot permanently on the backing plate. Tension links 116 and 118 are pivoted on the anchor 110, and are clamped by a nut 120, co-operating with the spacer bushing 108, frictionally against collar 112. Nut 120 acts through a spacer 122 on link 116.

Links 116 and 118 carry a pivot 124 at their upper ends, which pivot carries fittings 126 having radial thrust shoulders 128 engaged by radially-arranged thrust parts 130 riveted to the spaced webs or anchor arms of shoe 16. Parts 130 are held frictionally clamped against parts 128 by means such as a fastening 132 passing through an opening 134 and having a head engaging a washer 136. Fastening 132 carries a spring 138 compressed between part 128 and a washer 140 held by means such as a cotter pin 142.

While two illustrative embodiments have been described in detail, it is not my intention to limit the scope of the invention to those particular embodiments, or otherwise than by the terms of the appended claims.

I claim:

1. A brake comprising, in combination, a pair of friction devices having overlapping portions, means for taking braking torque from the overlapped end of one of said devices, and tension means connecting the overlapped end of the other of said devices to said torque-taking means.

2. A brake comprising, in combination, a pair of friction devices having overlapping portions, a fixed pivot for taking braking torque from the overlapped end of one of said devices, and tension means connecting the overlapped end of the other of said devices to said pivot.

3. A brake comprising, in combination, a pair of friction devices, one having a single anchoring arm at its end and the other having a pair of anchoring arms straddling the single arm, and an anchor taking the torque from the three arms, and which is directly engaged by the one friction device and which is linked to the other friction device.

4. A brake comprising, in combination, a pair of friction devices, one having a single anchoring arm at its end and the other having a pair of anchoring arms straddling the single arm, and an anchor taking the torque from the three arms, and which is directly engaged by the one friction device, together with a pair of links straddling said single arm and arranged beside the pair of arms and connecting the anchor to the other friction device.

5. A brake comprising a pair of overlapping friction devices, one of which has a fixed pivot at one end and the other of which is linked to said pivot.

6. A brake comprising a pair of friction devices, one of which has a fixed pivot at one end and the other of which is linked to said pivot.

7. A brake comprising a pair of friction devices, one of which overlaps the other and is anchored on a tension member extending toward its unanchored end.

8. A brake comprising a pair of friction devices, one of which overlaps the other and is anchored on an angularly-movable link extending approximately in the direction of the thrust of said device due to the braking torque.

9. A brake comprising a pair of overlapping friction devices anchored at their overlapping ends and one of which has its anchored end shiftable radially independently of the other.

10. A brake comprising a pair of overlapping friction devices having a single anchor adjacent the overlapping ends, at least one of said devices having its anchored end shiftable radially with respect to said anchor without interfering with the transmission of its braking torque to the anchor.

11. A brake friction device having an anchor between its ends and angularly-shiftable tension means connecting its end to said anchor.

12. A brake friction device having an anchor between its ends and having a tension link pivoted to its end and to said anchor.

13. A brake friction device having an anchor between its end and having a tension link pivoted to its end and to said anchor, together with friction means resisting angular shifting of one end of the link.

14. A brake friction device having an anchor between its ends and having a tension link pivoted to its end and to said anchor, together with friction means resisting angular shifting with respect to said device of the end of the link connected to the friction device.

15. A brake friction device having an anchor between its ends and having a tension link pivoted to its end and to said anchor, together with friction means resisting angular movement of the link with respect to the anchor.

16. A brake friction device having a fixed pivot between its ends and a movable pivot at one end, in combination with a link connecting the pivots.

17. A brake comprising two friction devices connected by a floating joint including a pivot carried by one device and radially-slidable means carried by the other device and engaging the pivot.

18. A brake comprising two friction devices connected by a floating joint including a flattened pivot carried by one device and a flattened member carried by the other device and slidably engaging the flattened portion of the pivot.

19. A brake comprising two friction devices connected by a floating joint including a pivot carried by one device and radially-slidable means carried by the other device and engaging the pivot, together with adjustable means acting on said pivot to determine its position when the brake is released.

20. A brake comprising a shoe and a pivot, in combination with a part mounted on the pivot and frictionally gripped to the shoe, the joint between the shoe and said part being substantially radial of the brake.

21. A brake shoe having a thrust surface extending crosswise adjacent one end, and having frictionally gripped thereto an anchor part engaging said surface.

22. A brake shoe having an anchoring part frictionally connected to its end and shiftable crosswise thereof, and having an anchor link connected to said part.

23. A brake having an anchor pivot, a link frictionally gripped to said pivot and a shoe firmly pivoted to said link.

In testimony whereof, I have hereunto signed my name.

ROY S. SANFORD.